United States Patent [19]

Lai

[11] Patent Number: 5,302,229
[45] Date of Patent: Apr. 12, 1994

[54] APPARATUS FOR APPLYING A RIM TAPE

[76] Inventor: Chien F. Lai, No. 51, 22 Road, Taichung Industrial Park, Taichung, Taiwan

[21] Appl. No.: 973,907

[22] Filed: Nov. 10, 1992

[51] Int. Cl.$^5$ ............................................. B32B 31/00
[52] U.S. Cl. .................................. 156/512; 156/380.9; 156/475; 156/499; 156/513; 156/510; 152/501; 152/513
[58] Field of Search .................... 156/512, 513, 502; 152/501, 513; 100/27

[56] References Cited

U.S. PATENT DOCUMENTS 2,846,303  12/1958  Brown et al. .................... 100/27
3,912,333  10/1975  Von Heitlinger ............ 152/501 X Primary Examiner—David A. Simmons
Assistant Examiner—M. Curtis Mayes
Attorney, Agent, or Firm—Robbins, Berliner & Carson

[57] ABSTRACT

An apparatus for utilizing a wheel rim tape around a wheel rim. The apparatus has a table. A first device is used for holding the spoked wheel on the table. A strap is induced manually about the wheel rim, thereby forming a loop. A second device is used for shearing the loop from the strap, with two terminal portions of the loop overlapping with each other. The second device is used for adhering the first and second terminal portions of the loop.

10 Claims, 5 Drawing Sheets

APPARATUS FOR APPLYING A RIM TAPE

BACKGROUND OF THE INVENTION

1. Field of Invention

The present invention relates to a wheel rim to which a number of spokes are attached by means of a corresponding number of threaded nipples and, more particularly, to a rim tape for protecting inner tubes from the threaded nipples and the spoke ends, still more particularly, to an apparatus for applying the rim tape.

2. Related Prior Art

Referring to FIGS. 7 and 8, a conventional spoked wheel is shown. The spoked wheel consists of a hub 2, a number of spokes 4 and a rim 6. Each of the spokes 4 has an enlarged end and a threaded end. Each of the spokes 4 is inserted through one of a corresponding number of holes defined in the hub 2. The enlarged ends of the spokes 4 are trapped by the hub 2. The threaded ends of the spokes 4 project through a corresponding number of holes defined in the rim 6 and engage with a corresponding number of threaded nipples 8. As the spokes 4 are identical, only one of the spokes 4 is shown in FIG. 7 in order to illustrate how the threaded nipples 8 attach the spokes 4 to the rim 6, i.e., completing a spoked wheel. The threaded nipple 8 consists of a body and an enlarged head. The body consists of an upper portion with a circular cross section and a lower portion with a square cross section. A threaded passage is axially formed throughout the threaded nipple 8. The body of the nipple 8 is inserted through one of the holes defined in the rim 6. The enlarged head of the threaded nipple 8 is trapped by the rim 6. The threaded passage of the threaded nipple 8 engages with the threaded end of the spoke 4. The lower portion of the spoke 4 is for engagement with a wrench (not shown) so that the threaded nipple 8 can be rotated in order to load the spoke 4 with tension. If all of the spokes 4 are loaded with the identical tension, the spoked wheel is completed. An inner tube and an outer tire are mounted on the rim 6. However, the threaded ends of the spokes 4 and the enlarged heads of the threaded nipples 8 are exposed over the rim 6 so that the threaded ends of the spokes 4 and the enlarged heads of the threaded nipples 8 would contact and might abrade the inner tube if not for use of a rim tape 10. As clearly shown in FIG. 8, one endless rim tape 10 is manually mounted on the rim 6. Therefore, the present invention is intended to solve the above-mentioned problem.

SUMMARY OF THE INVENTION

It is an object of the present invention to provide an apparatus for applying a wheel rim tape about a wheel rim.

It is another object of the present invention to provide an apparatus which has a table, a first device and a second device. The first device is used for holding the spoked wheel on the table. A strap is manually induced about the wheel rim, thereby forming a loop. A second device is used for shearing the loop from the strap, with two terminal portions of the loop overlapping with each other. The second device is also used for adhering the first and second terminal portions of the loop.

For a better understanding of the present invention and objects thereof, a study of the detailed description of the embodiments described hereinafter should be made in relation to the accompanying drawings.

BRIEF DESCRIPTION OF THE DRAWINGS

FIG. 4 is a perspective of a device for forming a hole in a rim tape for allowing a valve formed on an inner tube to pass through;

DETAILED DESCRIPTION OF THE PREFERRED EMBODIMENT

Figure 7:
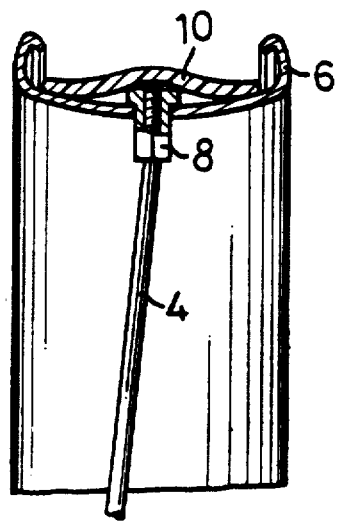
FIG. 7 is a partially cross-sectional view of a rim, a spoke and a rim tape according to prior art
Figure 8:
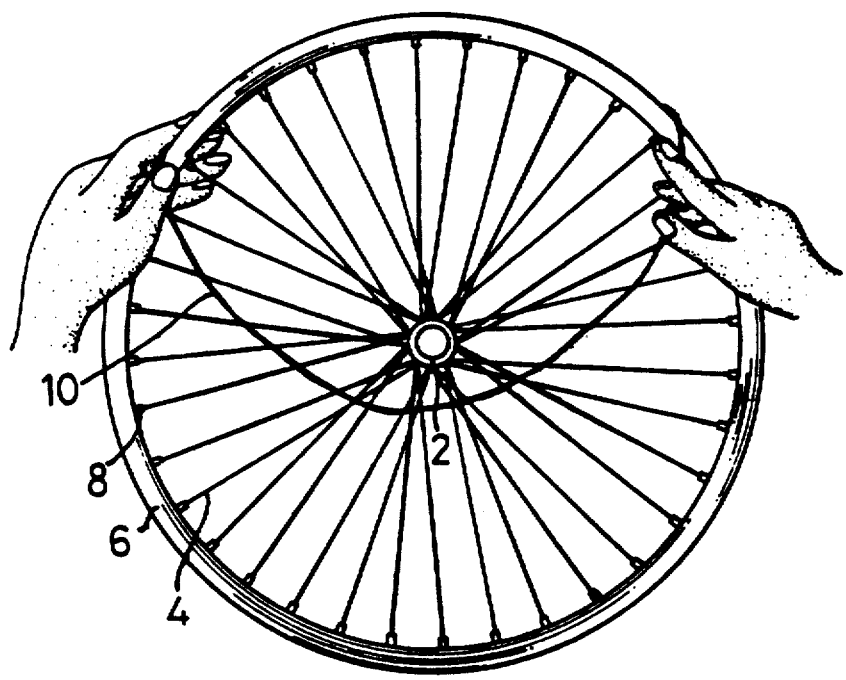
FIG. 8 is a front view of a spoked wheel, showing an endless rim tape manually mounted on a rim.

The present invention relates to an apparatus for applying a wheel rim tape around a wheel rim. As described above with reference to FIGS. 7 and 8, a conventional spoked wheel consists of a hub 2, a number of spokes 4, a rim 6 and a corresponding number of threaded nipples 8.

Figure 1:
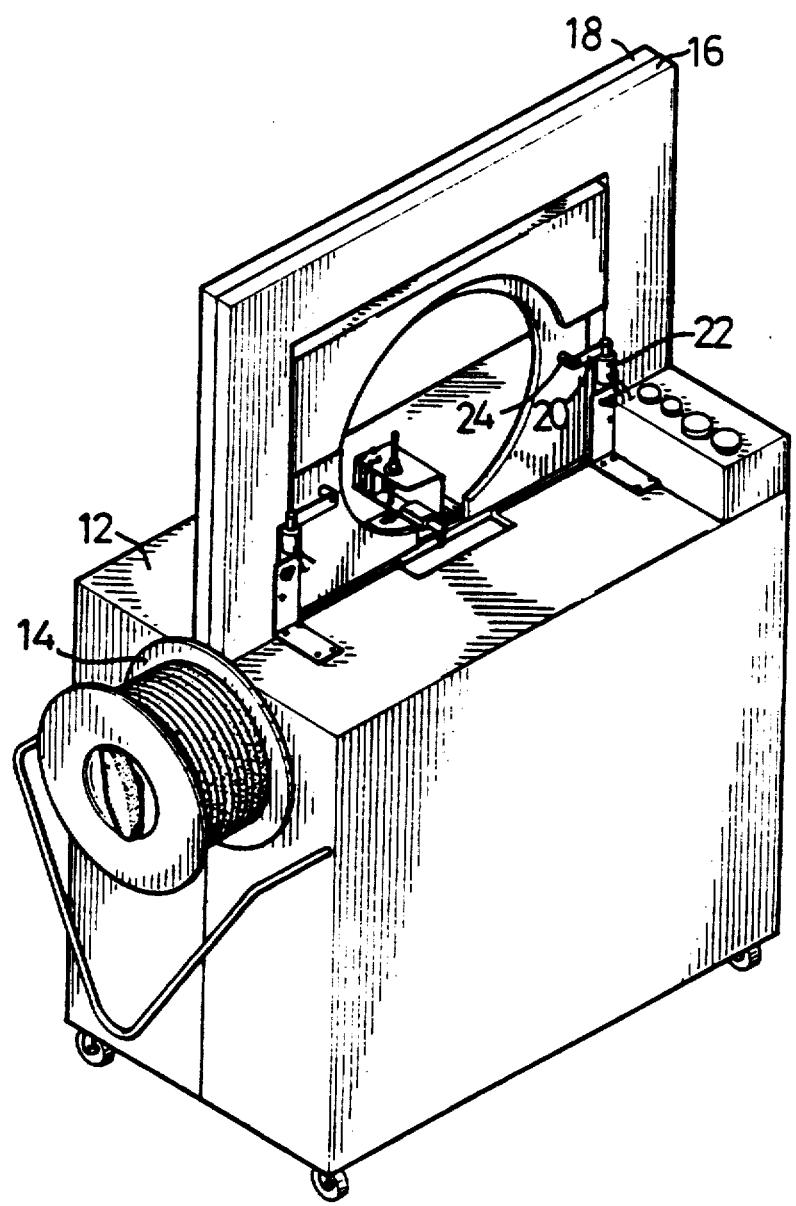
FIG. 1 is a perspective view of an apparatus for applying a rim tape according to the present invention.

Referring to the drawings and, initially, to FIG. 1, the apparatus for applying a wheel rim tape around a wheel rim has a horizontal table 12 and a pulley 14 for bearing a strap in the form of a roll. The apparatus further has a wheel-holding device, a tape-forming device and a hole-forming device.

Figure 2:
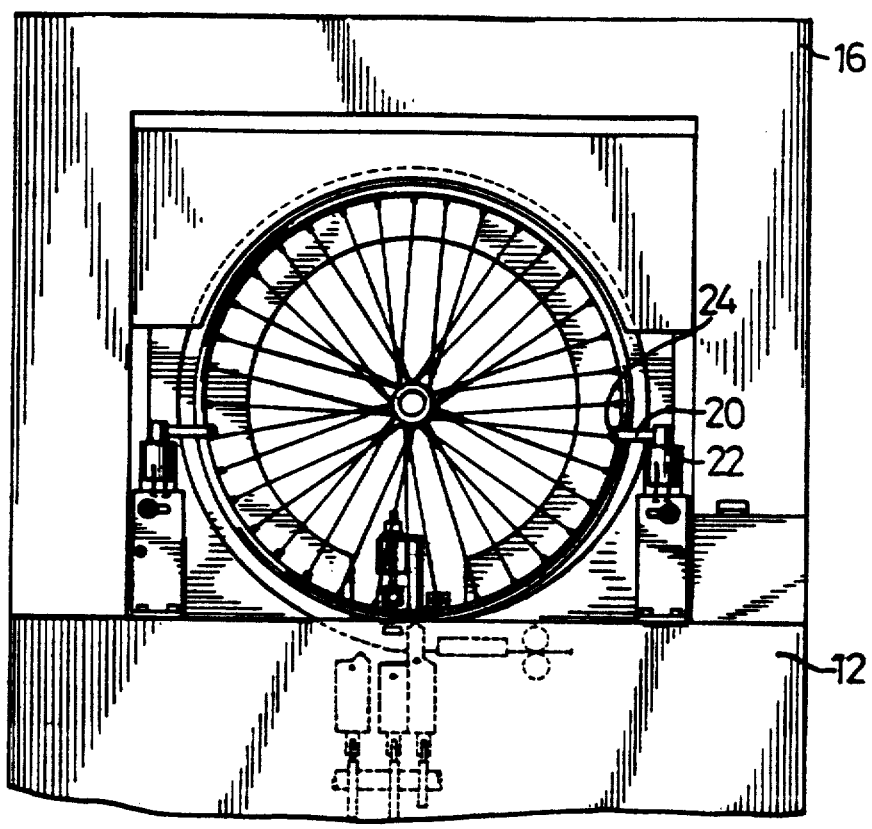
FIG. 2 is a partially front view of an apparatus for applying a rim tape according to the present invention.
Figure 3:
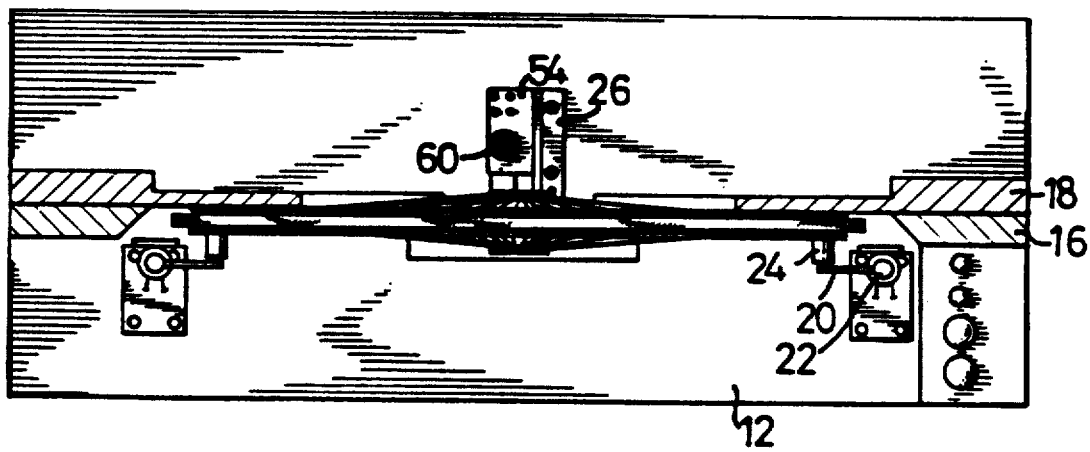
FIG. 3 is a top view of an apparatus for applying a rim tape according to the present invention.

The wheel-holding device is mounted on the table 12. The wheel-holding device has front frames 16 and 18 both vertically mounted on the table 12, against each other. The table 12 and the front frame 16 define a rectangular opening, so that the spoked wheel can be moved past the front frame 16 through the rectangular opening in order to be sited against the rear frame 18 (see FIG. 2). The table 12 and the rear frame 18 define an Ω-like opening so that the hub 2 can be moved partially beyond the rear frame 18 through the Ω-like opening. Thus, the rim 6 can be sited closely against the rear frame 18, as the hub 2 is wider than the rim 6 (see FIG. 3).

Two robots are mounted on the table 12 against the front frame 16 beside the Ω-like opening. Each of the robots has an arm 20 and a hydraulic cylinder 22. The arm 20 is linked to a pad 24, at its free end. The arm 20 can be pivoted between a first position and a second position by means of the hydraulic cylinder 22. In the first position, the arms 20 are beyond the rectangular opening, so that the spoked wheel can be moved through the rectangular opening. In the second position, the arms 20 are pivoted by means of the hydraulic cylinder 22 so as to have the pads 24 firmly abut the rim 6 against the rear frame 18.

Figure 4:
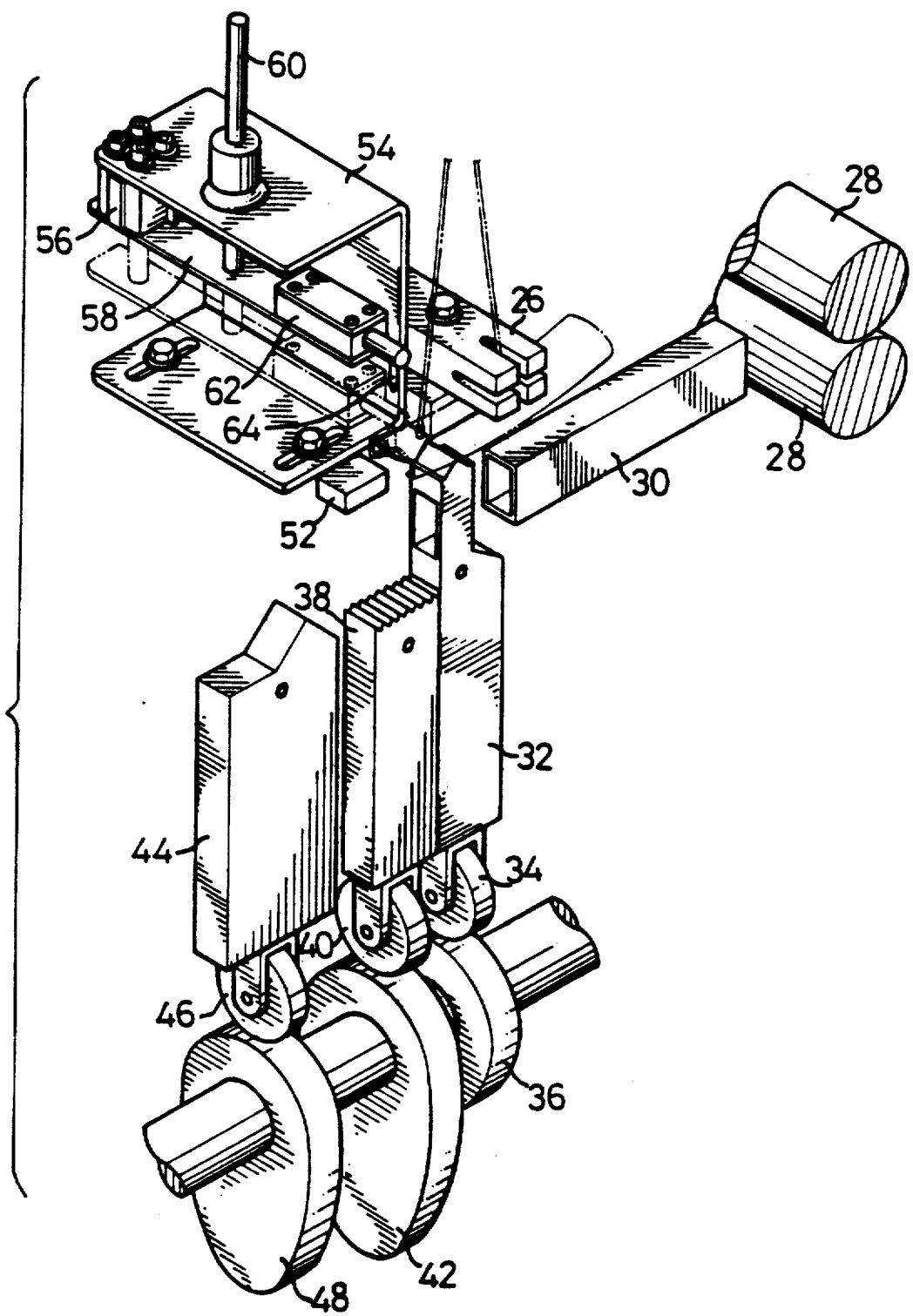

Further referring to FIG. 4, a spoke-trapping bar 26 is secured on the table 12 by means of a threaded bolt. A slit is formed in an end of the spoke-trapping bar 26. One of the spokes 4 is sited in the slit, i.e., the spoke 4 is trapped by means of the spoke-trapping bar 26. The spoked wheel is restrained from moving and rotating by means of the rear frame 18, the robots and the spoke-trapping bar 26. That is, the spoked wheel is retained in position for further processes.

The tape-forming device and the hole-forming device are also shown in FIG. 4. The tape-forming device has two rollers 28 which can rotate at opposite directions and a tube 30 which is mounted beside the rollers 28. An abutting-and-shearing tappet 32 has a sharp top and a flat bottom. The abutting-and-shearing tappet 32 has a passage transversely extending therethrough, below the sharp top thereof. A roller 34 is mounted to the flat bottom of the abutting-and-shearing tappet 32. Thus, the abutting-and-shearing tappet 32 can be moved between a top position and a bottom position with the roller 34 engaging with a cam 36. A shearing-and-pressing tappet 38 has a serrated top and a flat bottom. A roller 40 is mounted to the flat bottom of the shearing-and-pressing tappet 38. Thus, the shearing-and-pressing tappet 38 can be moved between a top position and a bottom position with the roller 40 engaging with a cam 42. The first and shearing-and-pressing tappets 32 and 38 are mounted closely beside each other. Thus, the first and shearing-and-pressing tappets 32 and 38 co-operate with each other for shearing when the serrated top of the shearing-and-pressing tappet 38 is moved upward past an upper face of the passage defined in the abutting-and-shearing tappet 32. A abutting tappet 44 has a sharp top and a flat bottom. A roller 46 is mounted to the flat bottom of the abutting tappet 44. Thus, the abutting tappet 44 can be moved between a top position and a lower position with the roller 46 engaging with a cam 48. The cams 36, 42 and 48 are mounted on a common shaft 50, with different phases, i.e., the cams 36, 42 and 48 respectively push the tappets 32, 38 and 44 to their top positions at different points of time. A heater 52 is sited below the table 12.

The hole-forming device has a frame 54 consisting of a top, a wall and a bottom. The bottom of the frame 54 has two slots. Two threaded bolts are inserted through the slots defined in the bottom of the frame 54, for mounting the frame 54 on the table 12. A hydraulic cylinder 56 is secured beneath the top of the frame 54 by means of a number of threaded bolts, for manipulating a board 58. A guiding column 60 protrudes from the board 58 and passes through a hole defined in the top of the frame 54, so that the hydraulic cylinder 56 stably moves the board 58 between a top position and a bottom position. A heater 62 is mounted on the board 58. The heater 62 has a downward-extending piercing needle 64.

Figure 5:
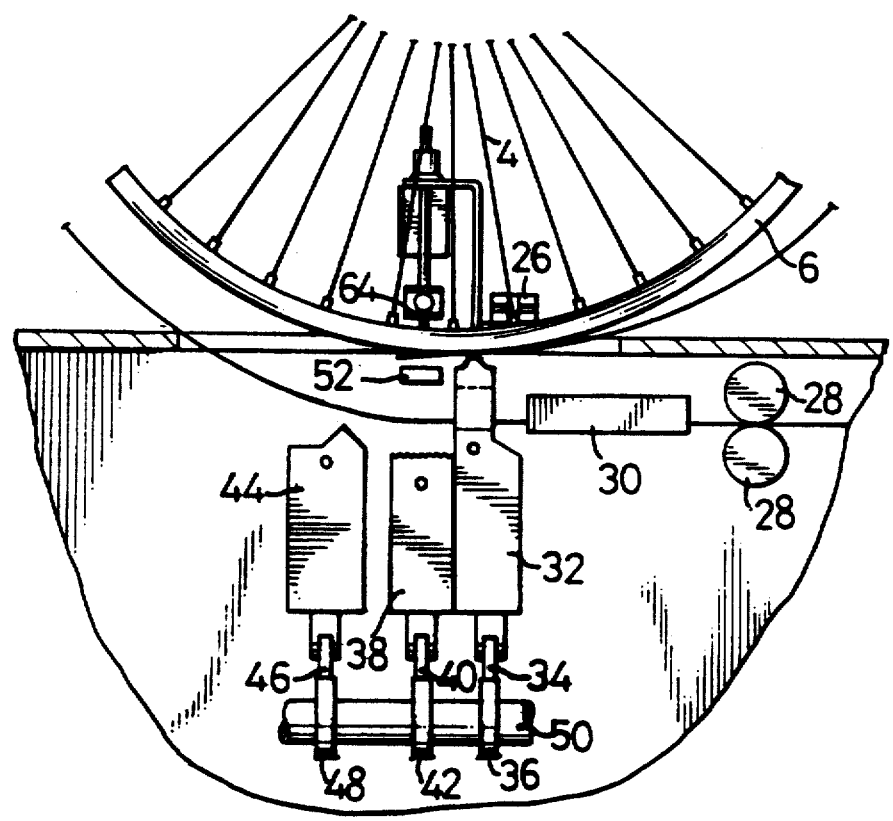
FIG. 5 is a front view of a device for forming a hole in a rim tape and a device for heat adhering two ends of a section of a strap in order to form a rim tape.

Further referring to FIG. 5, the arms 20 are in the first position. The spoked wheel is sited on the table 12, with the rim 6 sited closely against the rear frame 18. Then, the arms 20 are moved to the second position. The pads 24 abut the rim 6 firmly against the rear frame 18 while the hub 2 is retained partially through the Ω-like opening, so that the spoked wheel is restrained from moving. At that instant, one of the spokes 4 is trapped by means of the spoke-trapping bar 26, so that the spoked wheel is restrained from rotating. Thus, the spoked wheel is retained in position.

The strap is manually inserted through the passage defined in the abutting-and-shearing tappet 32. The strap is induced about the rim 6 and then sited between the rim 6 and the sharp top of the abutting-and-shearing tappet 32. Thus, a loop of strap is formed about the rim 6. The shaft 50 rotates so that the cam 34 pushes, by means of the roller 34, the abutting-and-shearing tappet 32 upward in order to firmly abut the loop, at a first spot, against the rim 6. For the convenience of description, the portion between the first end of the loop and where the sharp top of the abutting-and-shearing tappet 32 abuts the loop is referred to as a first terminal portion.

The rollers 28 rotate in order to retract the strap so that a tight loop is formed about the rim 6.

The shaft 50 rotates so that the cam 46 pushes the abutting tappet 44 upward by means of the roller 48 so as to firmly abut the loop, at a second spot, against the rim 6.

The heater 52 produces heat in order to melt the lower surface of the first terminal portion of the loop. The shaft 50 rotates, so that the cam 42 pushes the shearing-and-pressing tappet 38 upward by means of the roller 40. When the serrated top of the shearing-and-pressing tappet 38 passes the upper face of the passage defined in the abutting-and-shearing tappet 32, the loop is sheared from the strap, thereby forming a second end. For the convenience of description, the portion between the second end of the loop and where the sharp top of the abutting tappet 44 abuts the loop is referred to as a second terminal portion. The shearing-and-pressing tappet 38 is moved to its top position so that the serrated top of the shearing-and-pressing tappet 38 firmly abuts the second terminal portion against the first terminal portion. As the lower surface of the first terminal portion has previously molten, the first and second terminal portions are adhered together after being abutted against each other for a while.

The rim 6 has a valve-receiving hole through which a valve of an inner tube is inserted. A hole must be formed in the rim tape. The valve-receiving holes respectively defined in the rim 6 and the rim tape must align with each other in order to allow the valve to pass therethrough. It is desirable to have the piercing needle 64 penetrate the valve-receiving hole defined in the rim 6 in order to form the valve-receiving hole in the tape rim. Therefore, the valve-receiving hole defined in the rim 6 should be sited right below the piercing needle 64 when one of the spokes 4 is trapped by the spoke-trapping bar 26. The slots defined in the bottom of the frame 54 are used for adjusting the position of the piercing needle with respect to the spoke-trapping bar 26. The hydraulic cylinder 56 moves the heater 62 downward by means of the board 58, so that the piercing needle 64 passes through the valve-receiving hole defined in the rim 6 so as to melt and pierce the rim tape.

The shaft 50 rotates so that the tappets 32, 38 and 44 retract from the loop. The arms 20 retract to the first position. Therefore, the spoked wheel, together with the rim tape, can be moved from the table 12. Another spoked wheel can be sited on the table 12 for the same processes.

It should be known that the heater 52 can be replaced by a device for dispensing adhesive material onto the first terminal portion. The heater 62 and piercing needle 64 can be replaced by a device for punching the rim tape.

Figure 6:
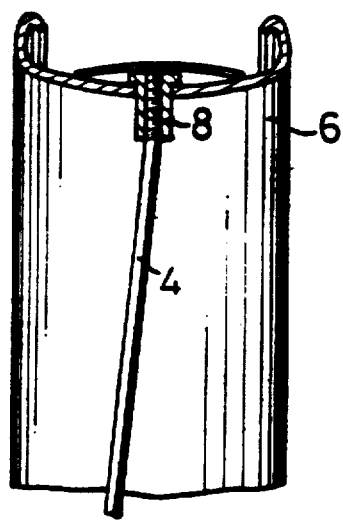
FIG. 6 is a partially cross-sectional view of a rim, a spoke and a rim tape according to the present invention.

Referring to FIG. 6, a rim 6 is enclosed by means of a rim tape in accordance with the present invention.

While the present invention has been explained in relation to its preferred embodiments, variations thereof will be apparent to those skilled in the art upon reading this specification. Therefore, the present invention is intended to cover all such variations as shall fall within the scope of the appended claims.

I claim:

1. An apparatus for applying a wheel rim tape around a wheel rim, comprising:
   a table;
   a first means comprising a frame against which the wheel rim is disposed, at least a robot for firmly abutting the wheel rim against said frame, and a spoke-trapping bar for trapping one of a number of spokes of the wheel rim;
   a second means for shearing a loop from a strap of wheel rim tape and for adhering first and second terminal portions of the loop, the loop manually sited about the wheel rim.

2. An apparatus in accordance with claim 1, wherein said frame defines an opening through which a hub of the wheel rim is partially inserted when the wheel rim is firmly abutted against said frame.

3. An apparatus in accordance with claim 1, wherein said robot comprises an arm being pivotable by means of a hydraulic cylinder.

4. An apparatus in accordance with claim 3, wherein said robot further comprises a pad attached to said arm, for abutting the wheel rim.

5. An apparatus in accordance with claim 1, wherein said spoke-trapping bar has an end defining a slit in which said spoke is trapped.

6. An apparatus in accordance with claim 1, wherein said second means comprises:
   abutting-and-shearing tappet having a top and a transverse passage through which the strap of wheel rim tape is manually induced so that the strap can be further induced about the rim, said top firmly abutting the loop at a first spot when said tappet is driven by a cam, the first terminal portion formed between a first end of the loop and the first spot;
   an abutting tappet having a top firmly abutting the loop against the wheel rim at a second spot when said abutting tappet is driven by a cam, the second terminal portion formed between a second end of the loop and said second spot;
   a shearing-and-pressing tappet mounted between said abutting-and-shearing and abutting tappets, closely beside said abutting-and-shearing tappet, said shearing-and-pressing tappet having a top so that said shearing-and-pressing tappet shears the loop from the strap of wheel rim tape when said top of said shearing-and-pressing tappet is driven upward past said transverse passage of said abutting-and-shearing-tappet by means of a cam; and
   an adhering means for producing adhesive material between the first and second terminal portions of the loop so that the first and second terminal portions of the loop are adhered together after being pressed together by means of said top of said shearing-and-pressing tappet.

7. An apparatus in accordance with claim 6, wherein said adhering means is a heater for melting a lower surface of the first terminal portion of the loop.

8. An apparatus in accordance with claim 1, further comprising a hole-forming device for forming a hole in the loop of wheel rim tape through which a valve of an inner tube is insertable.

9. An apparatus in accordance with claim 8, wherein said hole-forming device comprises a piercing needle for melting and piercing the adhered first and second terminal portions of the loop.

10. An apparatus in accordance with claim 9, wherein said piercing needle is driven by means of a hydraulic cylinder.

* * * * *